US012429669B2

(12) United States Patent
Yokoya

(10) Patent No.: US 12,429,669 B2
(45) Date of Patent: Sep. 30, 2025

(54) STEREOSCOPIC OPTICAL SYSTEM AND IMAGE PICKUP APPARATUS HAVING THE SAME

(71) Applicant: CANON KABUSHIKI KAISHA, Tokyo (JP)

(72) Inventor: Maki Yokoya, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 126 days.

(21) Appl. No.: 18/410,322

(22) Filed: Jan. 11, 2024

(65) Prior Publication Data

US 2024/0241345 A1 Jul. 18, 2024

(30) Foreign Application Priority Data

Jan. 13, 2023 (JP) ................................ 2023-003965

(51) Int. Cl.
*G02B 9/12* (2006.01)
*H04N 13/207* (2018.01)
*H04N 23/54* (2023.01)

(52) U.S. Cl.
CPC ............... *G02B 9/12* (2013.01); *H04N 23/54* (2023.01); *H04N 13/207* (2018.05)

(58) Field of Classification Search
CPC .......... G02B 9/12; G02B 13/04; G02B 13/06; G02B 13/18; H04N 23/54; H04N 13/207
See application file for complete search history.

(56) References Cited

U.S. PATENT DOCUMENTS

| | | | | |
|---|---|---|---|---|
| 10,527,825 | B2 * | 1/2020 | Mori | G02B 27/4211 |
| 11,092,780 | B2 * | 8/2021 | Mori | G02B 13/0035 |
| 11,252,394 | B2 | 2/2022 | Ebe | |
| 2012/0327276 | A1 * | 12/2012 | Ono | G02B 13/0065 348/E5.055 |
| 2013/0278731 | A1 * | 10/2013 | Inomoto | G03B 35/10 359/462 |
| 2014/0022417 | A1 * | 1/2014 | Yokoyama | G02B 15/144113 348/240.99 |
| 2016/0070094 | A1 * | 3/2016 | Togino | G02B 23/2415 348/46 |
| 2017/0031071 | A1 * | 2/2017 | Ishibashi | G02B 5/0891 |

(Continued)

FOREIGN PATENT DOCUMENTS

| | | | |
|---|---|---|---|
| JP | 2020008629 A | 1/2020 | |
| WO | WO-2022264700 A1 * | 12/2022 | G02B 13/18 |

*Primary Examiner* — Fernando Alcon

(74) *Attorney, Agent, or Firm* — Canon U.S.A., Inc. IP Division

(57) ABSTRACT

A stereoscopic optical system includes two optical systems arranged in parallel. Each of the two optical systems includes a plurality of lens units that consist of, in order from an object side to an image side, a first lens unit having negative refractive power, a second lens unit, and a third lens unit having positive refractive power. The first lens unit includes a first reflective member disposed closest to an image plane. The third lens unit includes a second reflective member disposed closest to an object. The second lens unit includes a plurality of lens units that consist of, in order from the object side to the image side, a first subunit having positive refractive power and a second subunit having negative refractive power that are spaced by a widest air gap. The second subunit includes an aperture stop disposed closest to the image plane.

15 Claims, 8 Drawing Sheets

(56) References Cited

U.S. PATENT DOCUMENTS

| | | | | |
|---|---|---|---|---|
| 2018/0143409 | A1* | 5/2018 | Mori | G02B 27/4211 |
| 2020/0014908 | A1* | 1/2020 | Ebe | G02B 9/12 |
| 2022/0221688 | A1* | 7/2022 | Yokoyama | H04N 13/207 |
| 2022/0400243 | A1* | 12/2022 | Shoji | H04N 23/60 |
| 2023/0014923 | A1* | 1/2023 | Yokoya | G02B 13/04 |
| 2023/0055267 | A1* | 2/2023 | Sakurada | A61B 1/05 |
| 2024/0337820 | A1* | 10/2024 | Taki | G02B 9/34 |

* cited by examiner

STEREOSCOPIC OPTICAL SYSTEM AND IMAGE PICKUP APPARATUS HAVING THE SAME

BACKGROUND

Technical Field

One of the aspects of the disclosure relates to a stereoscopic optical system and an image pickup apparatus suitable for imaging of stereoscopically viewable images (stereoscopic images or videos).

Description of Related Art

An image pickup apparatus has recently been demanded to capture images that are used for contents for providing realistic feeling, such as Virtual Reality (VR). In particular, a stereoscopic image pickup apparatus has been demanded to have an ultra-wide angle of view and to capture images from two viewpoints with parallax close to that of humans.

Japanese Patent Laid-Open No. 2020-008629 discloses a stereoscopic optical system that can capture stereoscopic images. This stereoscopic optical system includes two wide-angle lenses (optical systems) arranged in parallel and two reflective members disposed in each optical system to bend an optical path to form images on a single image sensor.

In an attempt to realize this configuration for a smaller image sensor, it is necessary to arrange the lens units on the image side closer than the reflective members located closest to the image planes of the two optical systems arranged in parallel. Therefore, the stereoscopic optical system disclosed in Japanese Patent Laid-Open No. 2020-008629 is demanded to reduce the size of each lens unit disposed between the reflective member disposed closest to the image plane and the image plane.

SUMMARY

A stereoscopic optical system according to one aspect of the disclosure includes two optical systems arranged in parallel. Each of the two optical systems includes a plurality of lens units that consist of, in order from an object side to an image side, a first lens unit having negative refractive power, a second lens unit, and a third lens unit having positive refractive power. The first lens unit includes a first reflective member disposed closest to an image plane in the first lens unit. The third lens unit includes a second reflective member disposed closest to an object in the third lens unit. The second lens unit includes a plurality of subunits (subunits) that consist of, in order from the object side to the image side, a first subunit having positive refractive power and a second subunit having negative refractive power that are spaced by a widest air gap in the second lens unit. The second subunit includes an aperture stop disposed closest to the image plane in the second subunit. An image pickup apparatus having the above stereoscopic optical system also constitutes another aspect of the embodiment.

Further features of various embodiments will become apparent from the following description of embodiments with reference to the attached drawings.

DESCRIPTION OF THE EMBODIMENTS

Figure 1A:
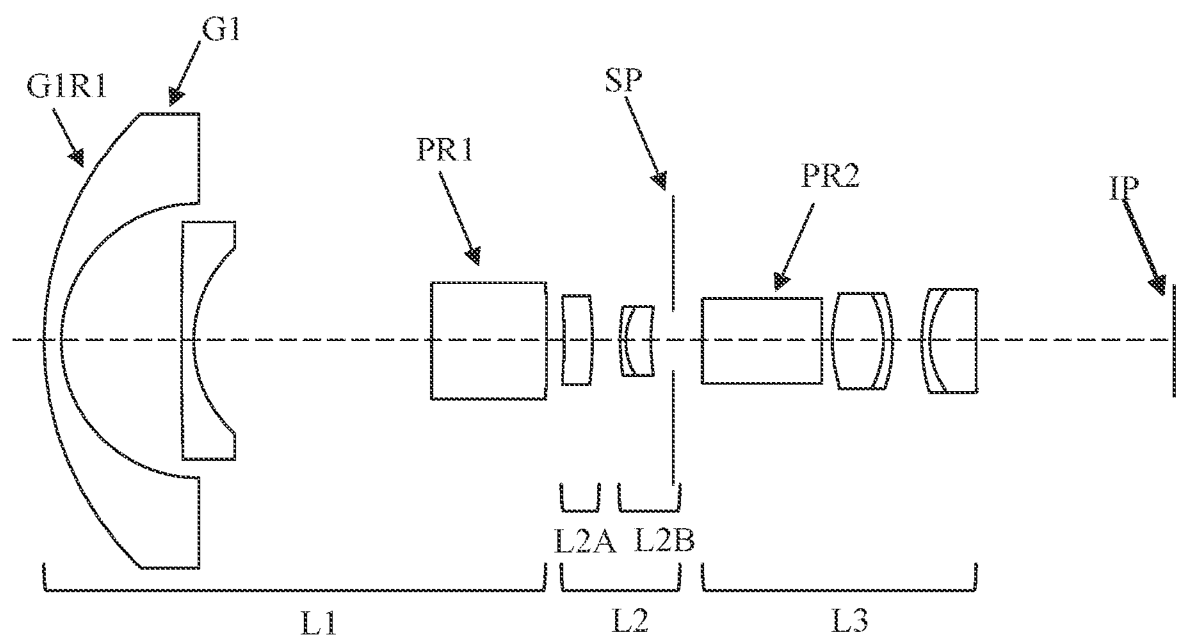
FIG. 1A is a sectional view of an optical system according to Example 1.
Figure 1B:
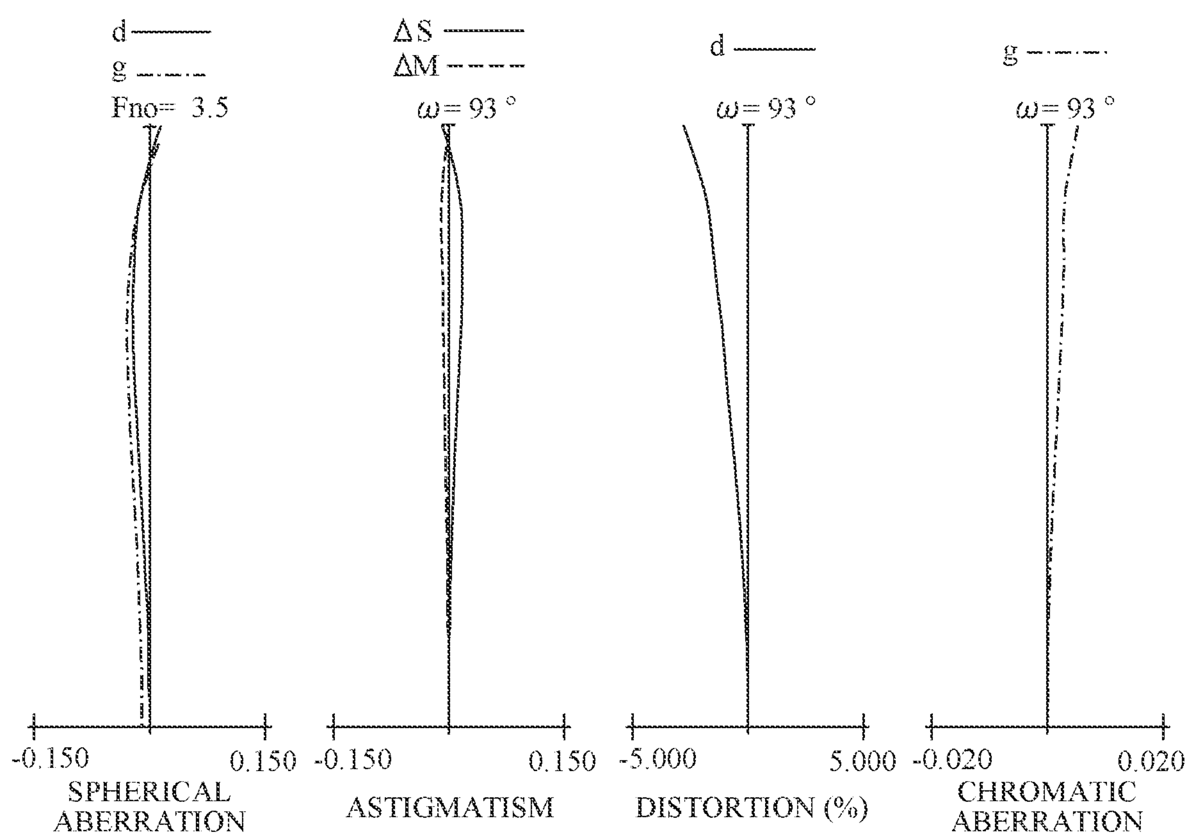
FIG. 1B is a longitudinal aberration diagram of the optical system according to Example 1.
Figure 2A:
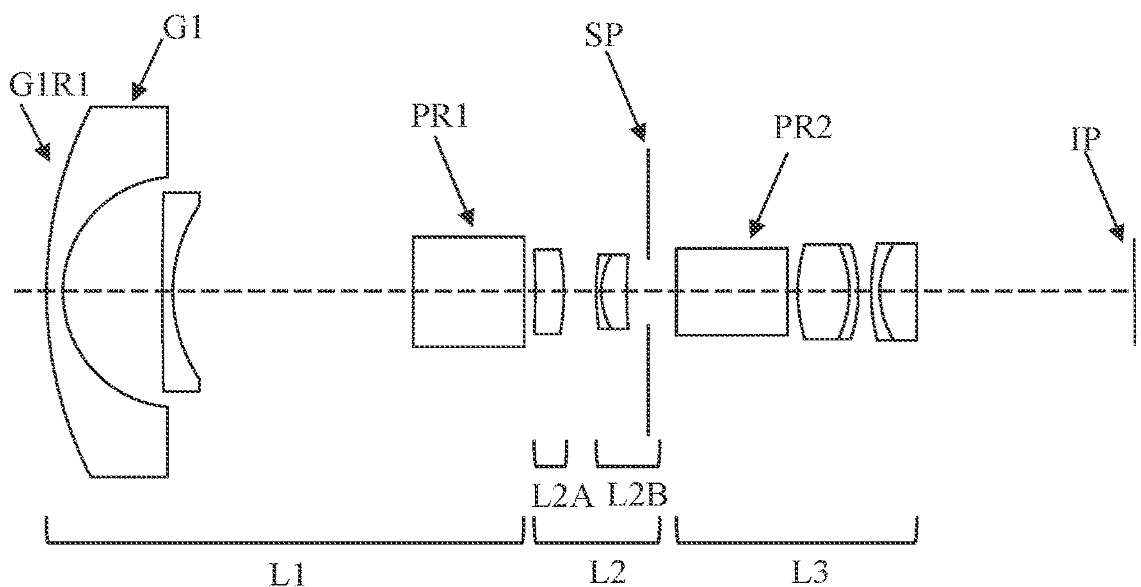
FIG. 2A is a sectional view of an optical system according to Example 2.
Figure 2B:
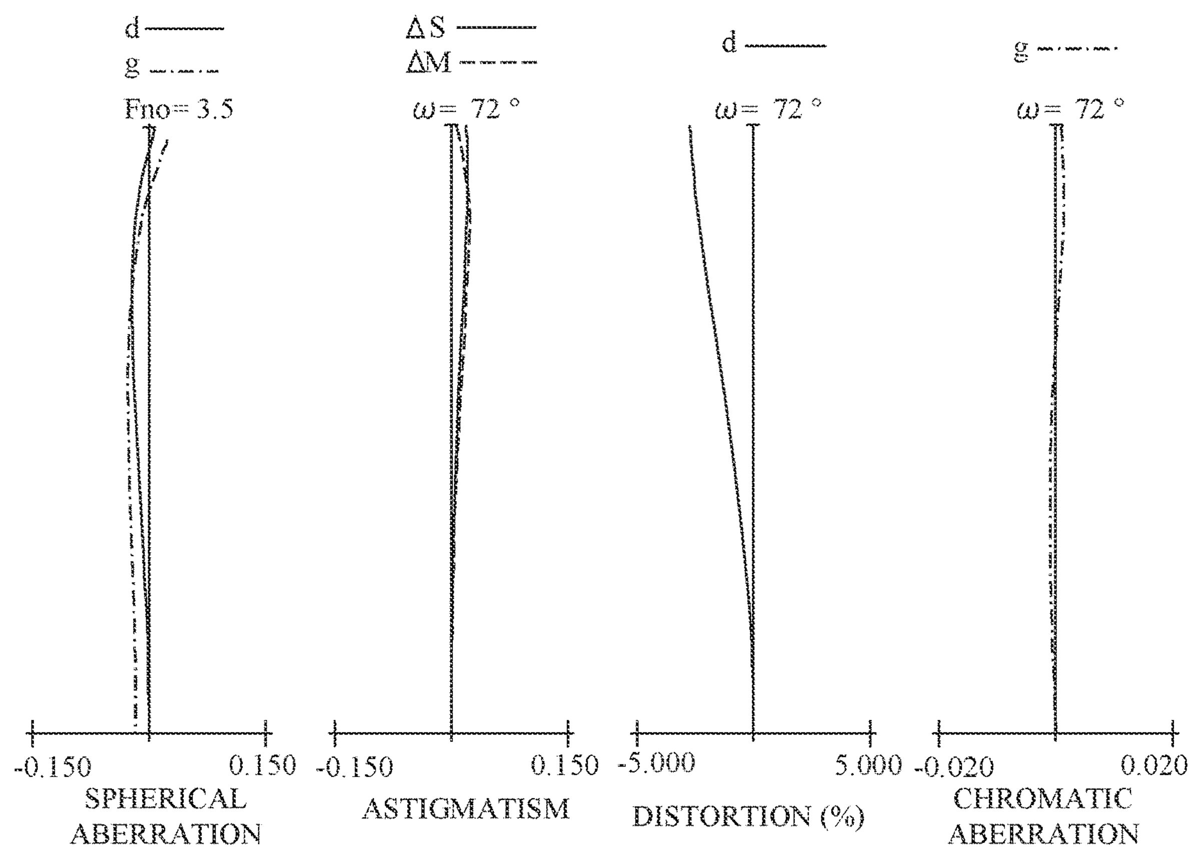
FIG. 2B is a longitudinal aberration diagram of the optical system according to Example 2.
Figure 3A:
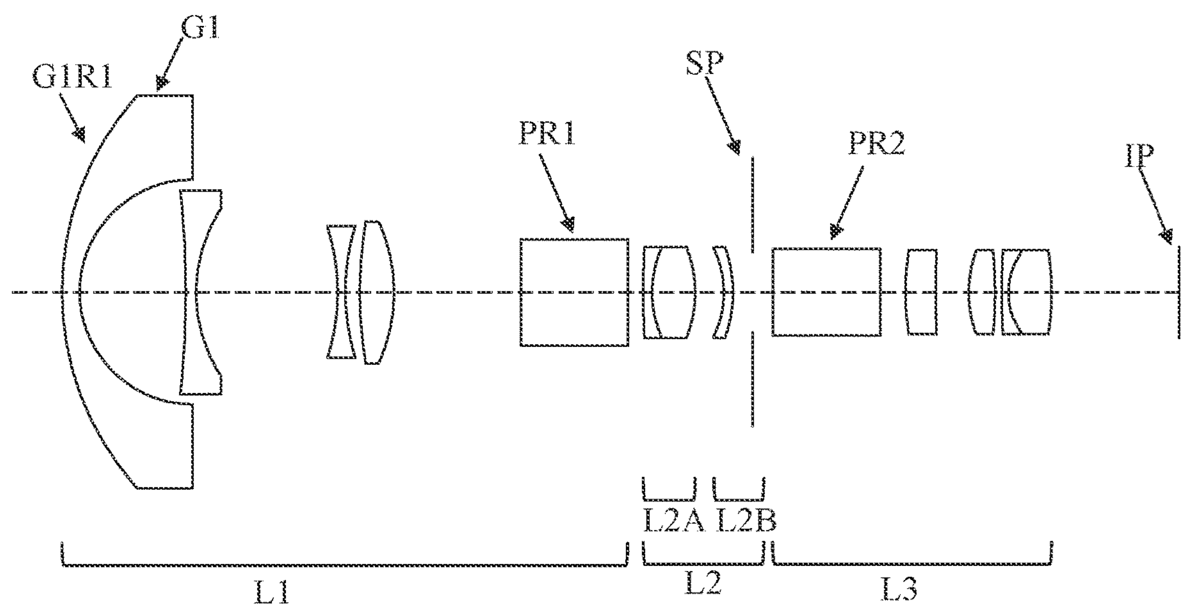
FIG. 3A is a sectional view of an optical system according to Example 3.
Figure 3B:
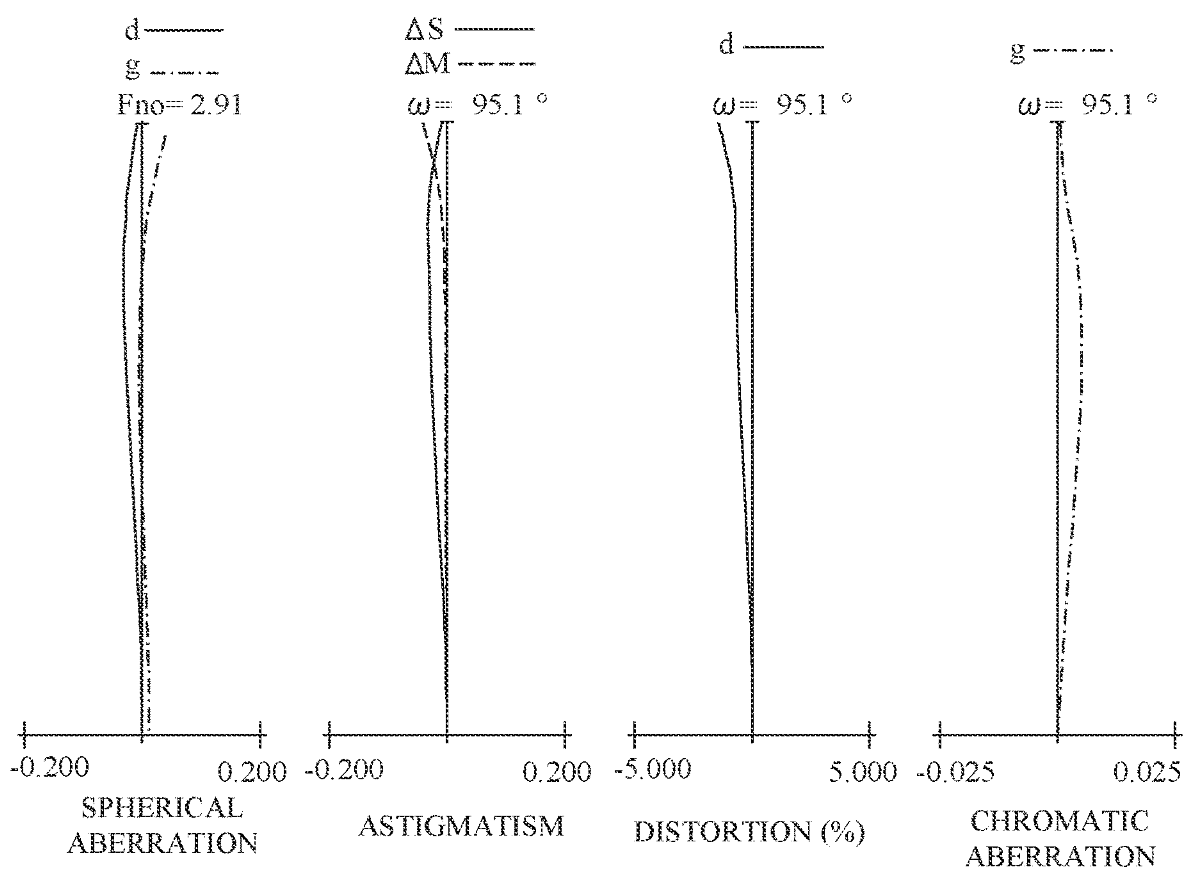
FIG. 3B is a longitudinal aberration diagram of the optical system according to Example 3.
Figure 4A:
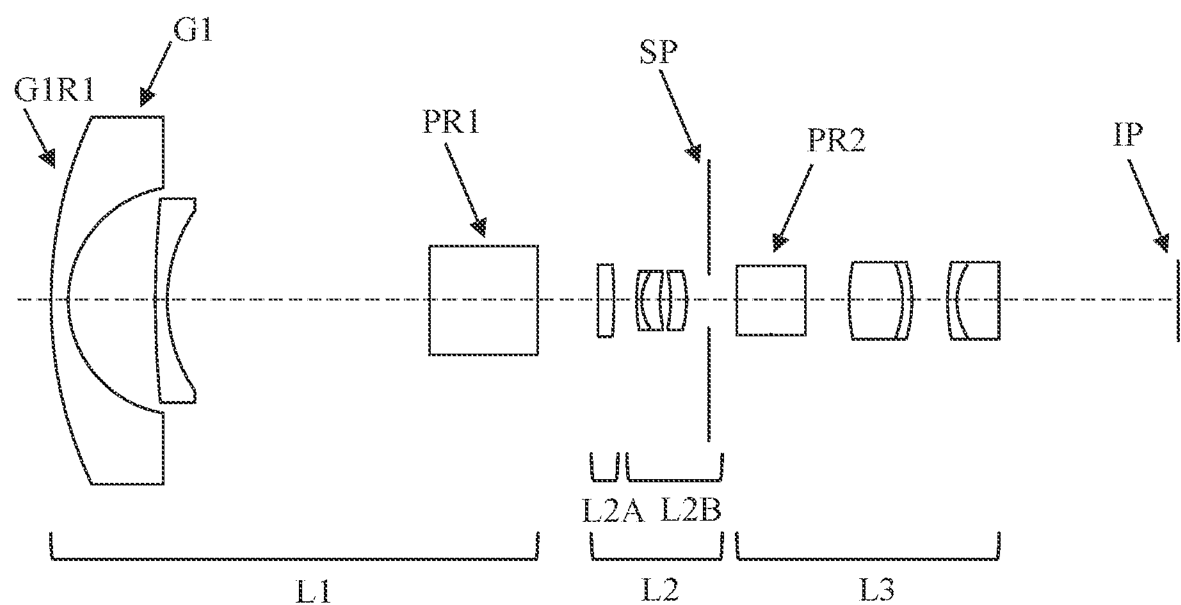
FIG. 4A is a sectional view of an optical system according to Example 4.
Figure 4B:
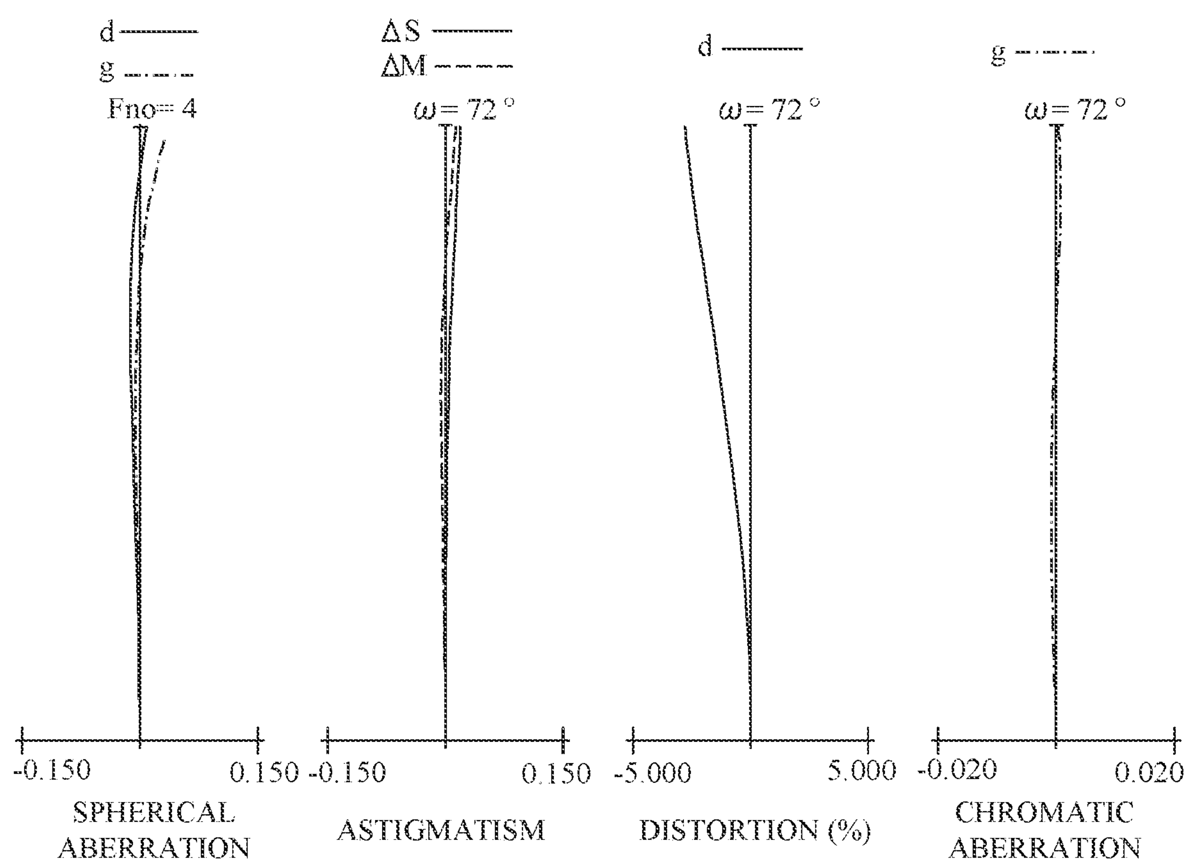
FIG. 4B is a longitudinal aberration diagram of the optical system according to Example 4.
Figure 5A:
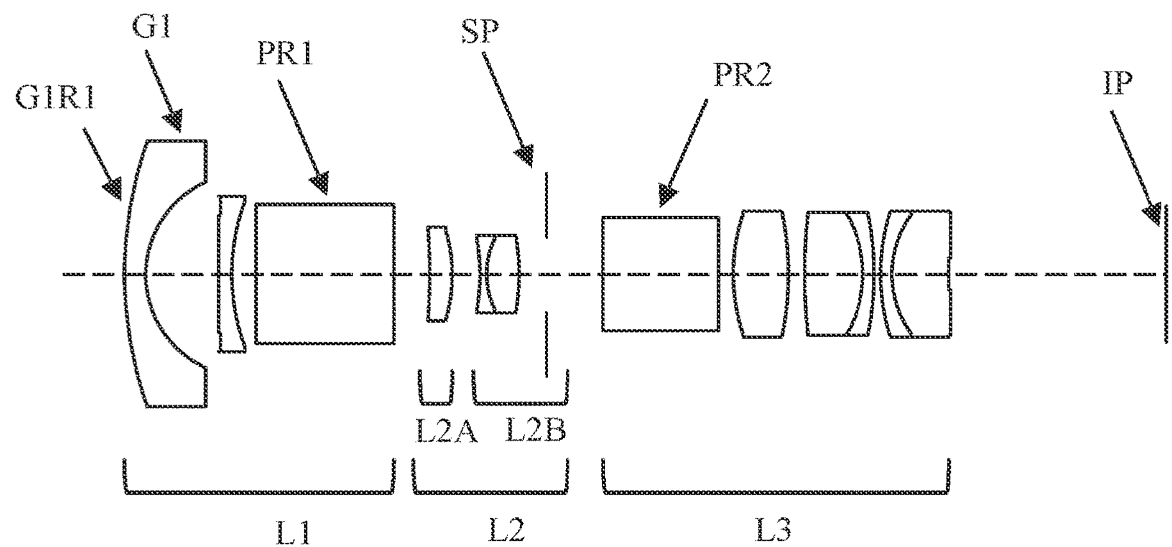
FIG. 5A is a sectional view of an optical system according to Example 5.
Figure 5B:
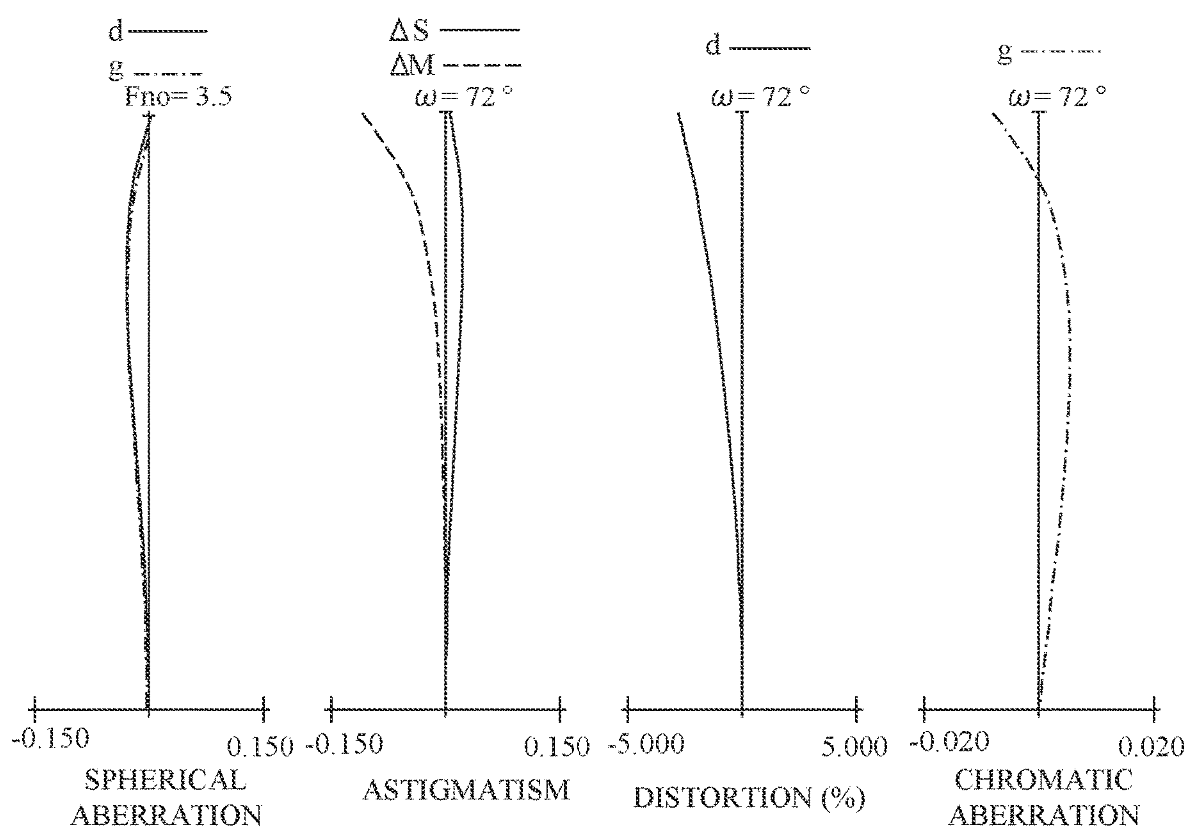
FIG. 5B is a longitudinal aberration diagram of the optical system according to Example 5.
Figure 6A:
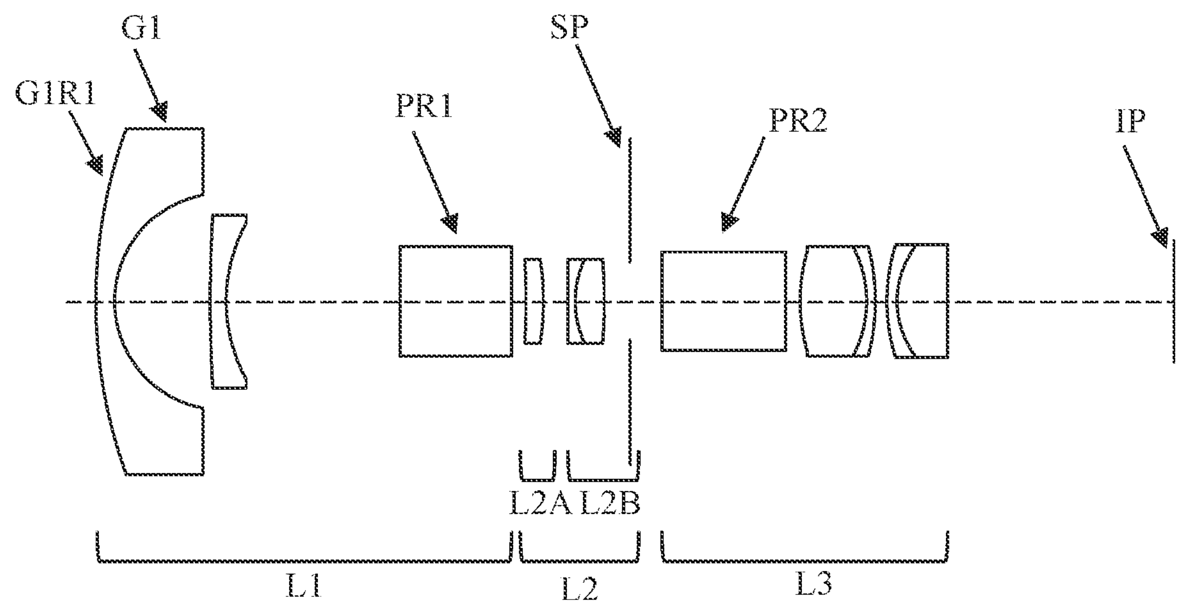
FIG. 6A is a sectional view of an optical system according to Example 6.
Figure 6B:
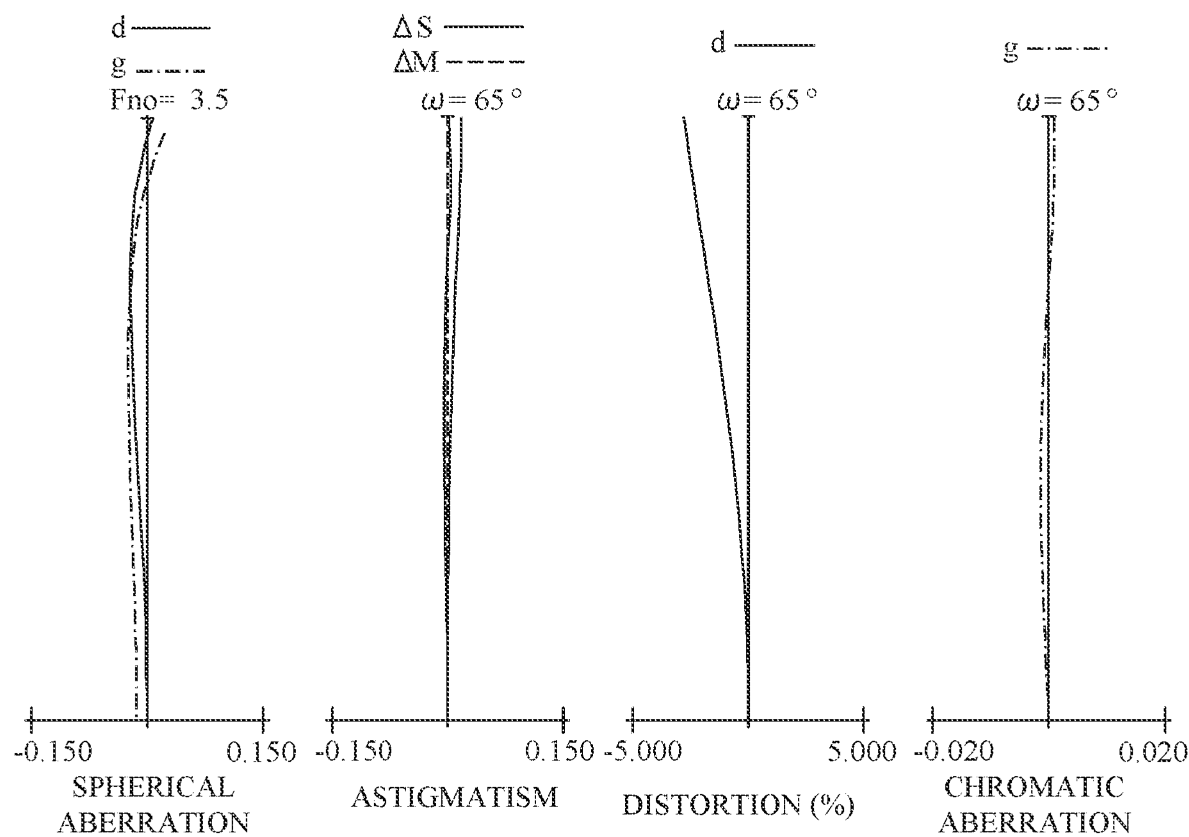
FIG. 6B is a longitudinal aberration diagram of the optical system according to Example 6.

Referring now to the accompanying drawings, a detailed description will be given of a stereoscopic optical system according to each example embodiment and an imaging pickup apparatus having the same. Corresponding elements in respective figures will basically be designated by the same reference numerals (unless otherwise specified), and a duplicate description thereof will be omitted. The stereoscopic optical system according to each example is used in an image pickup apparatus, such as a digital camera, a video camera, a broadcasting camera, a surveillance camera, and a film-based camera. In each example, two optical systems are arranged in parallel to the image sensor to obtain stereoscopic images.

Figure 7:
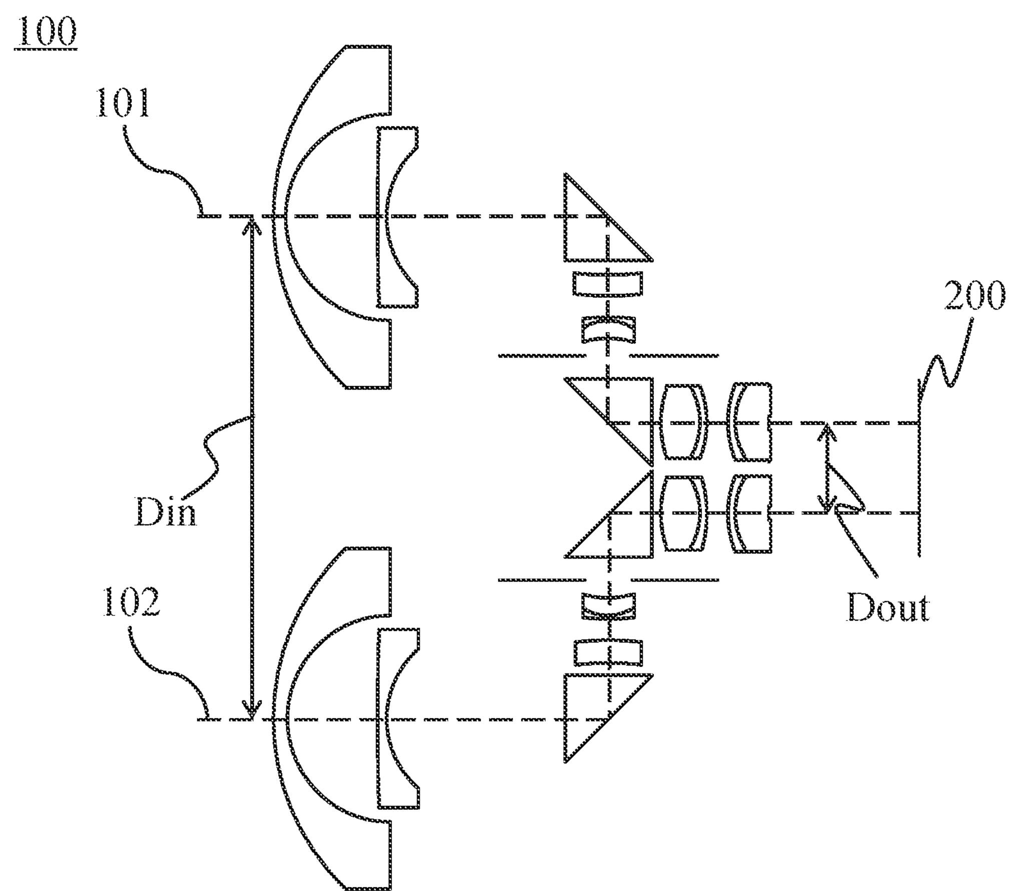
FIG. 7 is an overview of the stereoscopic optical system.
Figure 8:
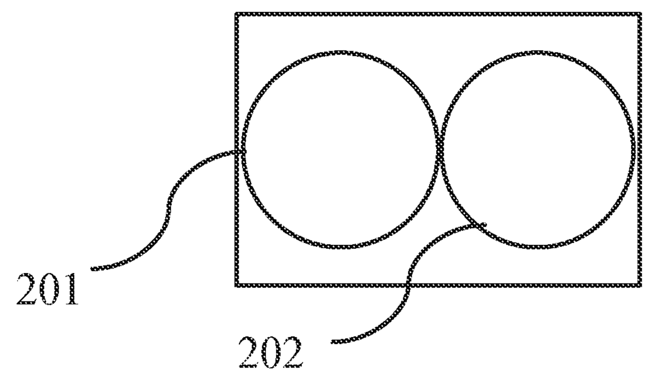
FIG. 8 schematically illustrates two image circles formed on a single image sensor by two optical systems.

FIG. 7 is a sectional view of the main parts of the stereoscopic optical system 100, which includes two optical systems (wide-angle lenses) 101 and 102. As illustrated in FIG. 7, the stereoscopic optical system 100 according to each example includes two optical systems 101 and 102, and the two optical systems 101 and 102 are arranged in parallel to the image sensor 200. FIG. 8 illustrates image circles 201 and 202 of the two optical systems 101 and 102 formed within the single image sensor 200 by bending the light beams incident on the optical systems 101 and 102 by reflective prisms. As illustrated in FIG. 8, the image circles 201 and 202 of two optical systems are arranged side by side on one image sensor 200. Images (optical images) are formed on the image plane of the image sensor 200 by optical systems 101 and 102. That is, in the stereoscopic optical system 100 according to this example, two optical images by the two optical systems 101 and 102 are formed on the single image sensor 200. The two optical systems 101 and 102 are held by an unillustrated housing. In each embodiment, the two optical systems 101 and 102 are the same except for a reflecting direction of the reflective member, which will be described below. Hereinafter, in this specification, when the optical systems 101 and 102 are said to be the same, it means that the lens configurations and the like are the same except for the reflecting direction of the reflective member.

The stereoscopic optical system 100 according to each example is a lens apparatus that is used in an image pickup apparatus configured to acquire a stereoscopically viewable image of an object with a wide angle of view, such as in panoramic imaging.

FIGS. 1A, 2A, 3A, 4A, 5A, and 6A are sectional views of the optical systems 101 (102) according to Examples 1, 2, 3, 4, 5, and 6, respectively. The optical system 101 (102) according to each example includes reflective prisms PR1 (first reflective member) and PR2 (second reflective member) as two reflective members, and actually reflects the optical path twice. That is, the optical path is bent twice.

In each lens sectional view, a left side is an object side (front) and a right side is an image side (back). The optical system 101 according to each example includes a plurality of lens units. Each lens unit may include one or more lenses. Each lens unit may include an aperture stop.

In each lens sectional view, Li represents an i-th lens unit (where i is a natural number) counting from the object side. SP represents an aperture stop. IP represents an image plane. In a case where the optical system 101 (102) according to each example embodiment is used as an imaging optical system of a digital still camera or a digital video camera, an imaging surface of a solid-state image sensor (photoelectric conversion element), such as a CCD sensor or a CMOS sensor, is placed on the image plane IP. In a case where the optical system 101 (102) according to each example embodiment is used as an imaging optical system of a film-based camera, a photosensitive surface corresponding to the film surface is placed on the image plane IP. Although not illustrated in the optical system 101 (102) according to each example embodiment, an optical block, such as an optical filter, a face plate, a low-pass filter, and an infrared cut filter, may be disposed on the object side of the image plane IP. PR1 and PR2 represent the reflective prisms serving as the reflective members.

FIGS. 1B, 2B, 3B, 4B, 5B, and 6B are aberration diagrams of the optical systems 101 (102) according to Examples 1, 2, 3, 4, 5, and 6 in an in-focus state at infinity, respectively.

In a spherical aberration diagram, Fno is an F-number. The spherical aberration diagram indicates spherical aberration amounts for the d-line (wavelength 587.6 nm) and the g-line (wavelength 435.8 nm). In an astigmatism diagram, $\Delta S$ indicates an astigmatism amount on the sagittal image plane, and $\Delta M$ indicates an astigmatism amount on the meridional image plane. A distortion diagram illustrates a distortion amount for the d-line. A chromatic aberration diagram illustrates a chromatic aberration amount for the g-line. $\omega$ is an imaging half angle of view (°) (angle of view in paraxial calculation), and indicates an angle of view based on a ray tracing value.

In order to experience a realistic three-dimensional image in viewing captured images on a head mount display, etc., a distance between the optical axes on the incident side of the two optical systems during imaging (base length) may be approximately set to the distance between the human eyes. Generally, the distance between the human eyes is about 60 to 65 mm. As the distance shift increases from the distance between the human eyes, the deviation from the three-dimensional sense increases based on human sense and experience, and the viewer feels uncomfortable. In a case where the base length becomes too short, no parallax is created between the left and right optical systems, and a three-dimensional effect cannot be obtained in viewing captured images. On the other hand, in a case where the base length becomes too long, excessive parallax occurs, the three-dimensional effect is emphasized in viewing captured images, and the viewer may feel fatigued.

A description will now be given of the characteristic configuration of the stereoscopic optical system 100 according to each example embodiment.

The stereoscopic optical system 100 according to each example embodiment includes two optical systems 101 and 102 arranged in parallel. The two optical systems 101 and 102 each consist of, in order from the object side to the image side, a first lens unit L1 having negative refractive power, a second lens unit L2 having refractive power, and a third lens unit L3 having positive refractive power. The first lens unit L1 includes a first reflective member PR1 disposed closest to the image plane in the first lens unit, and the third lens unit L3 includes a second reflective member PR2 disposed closest to the object. Thereby, the base length between the two wide-angle optical systems 101 and 102 can be secured and two images can be formed on a single image sensor.

The second lens unit L2 includes, in order from the object side to the image side, a second A subunit (first subunit) L2A having positive refractive power, and a second B subunit (second subunit) L2B having negative refractive power, which are spaced by the widest air gap in the second lens unit. The second B subunit L2B includes the aperture stop SP disposed closest to the image plane.

The third lens unit L3 needs to be smaller in order to avoid interference with the two optical systems 101 and 102 arranged in parallel. Accordingly, disposing the aperture stop SP closer to the image side can lower the height of the off-axis ray that determines the diameter of the third lens unit L3, and reduce the size of the third lens unit L3. However, since the space in the radial direction of the third lens unit L3 is narrow, it is difficult to place the aperture stop SP within the third lens unit L3. Therefore, the aperture stop SP may be disposed closest to the image plane of the second lens unit L2. Moreover, arranging the second B subunit L2B and the third lens unit L3 on both sides of the aperture stop SP can place the exit pupil closer to the image plane and reduce the size of the third lens unit L3 disposed behind (on the image side of) the aperture stop SP. Furthermore, aberrations such, as spherical aberration and coma, generated in the third lens unit L3 can be corrected by the second B subunit L2B adjacent to the third lens unit L3, and high optical performance can be maintained. In a case where the second lens unit L2 consists of a subunit having negative refractive power, the diameter of the light beam incident on the third lens unit L3 increases, and the second reflective member PR2 becomes larger. In order to reduce the size of the second reflective member PR2, the second lens unit L2 includes the second A subunit L2A having positive refractive power disposed on the object side, so that the diameter of the light beam incident on the third lens unit L3 can be reduced and the size of the second reflective member PR2 can be reduced. The distance between the optical axes between the first reflective member PR1 and the second reflective member PR2 is determined by the size of the image sensor, the maximum image height, the base length of the stereoscopic optical system 100, and the like. Therefore, the distance between the optical axes between the first reflective member PR1 and the second reflective member PR2 is limited, and the second lens unit L2 may consist of the second A subunit L2A and the second B subunit L2B.

The above configuration can provide a stereoscopic optical system that can capture stereoscopic images and is compatible with a smaller image sensor.

A description will be given of conditions and configurations that may be satisfied by the stereoscopic optical system 100 according to each example embodiment.

The stereoscopic optical system 100 according to each example embodiment may satisfy the following inequality (1):

$$0.33 < dPI/dTotal < 0.67 \tag{1}$$

where dPI is a distance on the optical axis from the aperture stop SP to the image plane IP. dTotal is a distance on the optical axis from a lens surface on the object side of the lens disposed closest to the object in the optical system 101 (102) to the image plane IP.

Inequality (1) defines a ratio of the distance on the optical axis from the aperture stop SP to the image plane IP, and the distance on the optical axis from the lens surface on the object side of the lens disposed closest to the object in the optical system 101 (102) to the image plane IP. In a case where the value becomes higher than the upper limit of inequality (1), the aperture stop SP moves away from the image plane IP, and the height of the off-axis ray that determines the diameter of the third lens unit L3 increases. Therefore, the size of the third lens unit L3 cannot be reduced. In a case where the value becomes lower than the lower limit of inequality (1), the aperture stop SP approaches the image plane IP, and it is necessary to dispose the aperture stop SP in the third lens unit L3. However, since the third lens unit L3 has a narrow space in the radial direction, it becomes difficult to dispose the aperture stop SP.

Inequality (1) may be replaced with inequality (1a) or (1b) below:

$$0.34 < dPI/dTotal < 0.64 \tag{1a}$$

$$0.36 < dPI/dTotal < 0.62 \tag{1b}$$

The stereoscopic optical system 100 according to each example embodiment may satisfy the following inequality (2):

$$-12.89 < f2B/f3 < -1.25 \tag{2}$$

where f2B is a focal length of the second B subunit L2B, and f3 is a focal length of the third lens unit L3.

Inequality (2) defines a ratio of the focal length of the second B subunit L2B to the focal length of the third lens unit L3. In a case where the value becomes higher than the upper limit of inequality (2), the refractive power of the third lens unit L3 increases and it becomes difficult for the second B subunit L2B to correct spherical aberration and coma occurring in the third lens unit L3. In a case where the value becomes lower than the lower limit of inequality (2), the refractive power of the second B subunit L2B increases, and the diameter of the light beam incident on the third lens unit L3 increases. Thus, it becomes difficult to reduce the size of the third lens unit L3, particularly the second reflective member PR2 disposed closest to the object in the third lens unit L3.

Inequality (2) may be replaced with inequality (2a) or (2b) below:

$$-11.89 < f2B/f3 < -1.63 \tag{2a}$$

$$-10.90 < f2B/f3 < -1.98 \tag{2b}$$

The stereoscopic optical system 100 according to each example embodiment may satisfy the following inequality (3):

$$0.03 < Dout/Din < 0.50 \tag{3}$$

where Din is a distance between surface vertices of lenses disposed closest to the object in the first lens units L1 of the two optical systems 101 and 102 (a distance between the optical axes of the first lens units L1), and Dout is a distance between surface vertices of lenses disposed closest to the image plane in the third lens units L3 of the two optical systems 101 and 102 (a distance between the optical axes of the third lens units L3).

Inequality (3) defines a ratio of the distance between the optical axes of the first lens units L1 and the distance between the optical axes of the third lens units L3. In a case where the value becomes lower than the lower limit of inequality (3), the base length becomes insufficient and a sufficient three-dimensional effect cannot be obtained. In a case where the value becomes higher than the upper limit of inequality (3), the parallax becomes excessive.

Inequality (3) may be replaced with inequality (3a) or (3b) below:

$$0.08 < Dout/Din < 0.27 \tag{3a}$$

$$0.11 < Dout/Din < 0.25 \tag{3b}$$

The stereoscopic optical system 100 according to each example embodiment may satisfy the following inequality (4):

$$-3.18 < f1/f < -1.05 \tag{4}$$

where f1 is a focal length of the first lens unit L1, and f is a focal length of the optical system 101 (102).

Inequality (4) defines a ratio between the focal length of the first lens unit L1 and the focal length of the optical system 101 (102). In a case where the value becomes higher than the upper limit of inequality (4), the refractive power of the first lens unit L1 becomes small and a wide angle of view of the optical system 101 (102) cannot be realized. In addition, the first lens unit L1 becomes large, and interference between the optical systems 101 and 102 occurs in a case where the two optical systems 101 and 102 are arranged in parallel. In a case where the value becomes lower than the lower limit of inequality (4), the refractive power of the first lens unit L1 becomes large, distortion, curvature of field, and lateral chromatic aberration occur in the first lens unit L1, and high optical performance becomes unavailable.

Inequality (4) may be replaced with inequality (4a) or (4b) below:

$$-3.05 < f1/f < -1.11 \quad (4a)$$

$$-2.91 < f1/f < -1.18 \quad (4b)$$

The stereoscopic optical system 100 according to each example embodiment may satisfy the following inequality (5):

$$-1.42 < f2A/f2B < -0.16 \quad (5)$$

where f2A is a focal length of the second A subunit L2A, and f2B is the focal length of the second B subunit L2B.

Inequality (5) defines a ratio of the focal length of the second A subunit L2A to the focal length of the second B subunit L2B. In a case where the value becomes higher than the upper limit of inequality (5), the refractive power of the second B subunit L2B increases, the diameter of the light beam incident on the third lens unit L3 increases, and it becomes difficult to reduce the size of the third lens unit L3, particularly the second reflective member PR2 disposed closest to the object in the third lens unit L3. In a case where the value becomes lower than the lower limit of inequality (5), the refractive power of the second A subunit L2A increases, and it becomes difficult for the second B subunit L2B to correct spherical aberration and coma that occur in the second A subunit L2A.

Inequality (5) may be replaced with inequality (5a) or (5b) below:

$$-1.36 < f2A/f2B < -0.18 \quad (5a)$$

$$-1.30 < f2A/f2B < -0.20 \quad (5b)$$

The stereoscopic optical system 100 according to each example embodiment may satisfy the following inequality (6):

$$-8.34 < f2A/f1 < -3.32 \quad (6)$$

where f2A is the focal length of the second A subunit L2A, and f1 is the focal length of the first lens unit L1.

Inequality (6) defines a ratio between the focal length of the second A subunit L2A and the focal length of the first lens unit L1. In a case where the value becomes higher than the upper limit of inequality (6), the refractive power of the first lens unit L1 increases, it becomes difficult for the second A subunit L2A to correct distortion, curvature of field, and lateral chromatic aberration occurring in the first lens unit L1, and high optical performance cannot be realized. In a case where the value becomes lower than the lower limit of inequality (6), the refractive power of the second A subunit L2A increases, it becomes difficult for the first lens unit L1 to correct distortion, curvature of field, and lateral chromatic aberration occurring in the second A subunit L2A. In addition, the refractive power of the first lens unit L1 becomes small, and a wide angle of view of the optical system 101 (102) cannot be realized.

Inequality (6) may be replaced with inequality (6a) or (6b) below:

$$-8.00 < f2A/f1 < -3.53 \quad (6a)$$

$$-7.65 < f2A/f1 < -3.74 \quad (6b)$$

The stereoscopic optical system 100 according to each example embodiment may satisfy the following inequality (7):

$$5.72 < dG1P/f < 30.72 \quad (7)$$

where dG1P is a distance on the optical axis from a lens surface G1R1 on the object side of the lens G1 disposed closest to the object to the aperture stop SP, and f is the focal length of the optical system 101 (102).

Inequality (7) defines a ratio between the distance on the optical axis from the lens surface G1R1 on the object side of the lens G1 disposed closest to the object to the aperture stop SP and the focal length of the optical system 101 (102). In a case where the value becomes higher than the upper limit of inequality (7), the lens G1 disposed closest to the object moves away from the aperture stop SP, and the height of the off-axis ray that determines the diameter of the lens G1 increases. Therefore, the size of the lens G1 cannot be reduced. In a case where the value becomes lower than the lower limit of inequality (7), the lens G1 approaches the aperture stop SP, and it becomes difficult to dispose the first reflective member PR1 and secure a sufficient base length.

Inequality (7) may be replaced with inequality (7a) or (7b) below:

$$6.48 < dG1P/f < 28.26 \quad (7a)$$

$$6.86 < dG1P/f < 27.03 \quad (7b)$$

In each of the two optical systems 101 and 102 of the stereoscopic optical system 100 according to each example embodiment, the second lens unit L2 may have positive refractive power. By reducing the diameter of the light beam incident on the second lens unit L2 from the first lens unit L1 having negative refractive power by using the positive refractive power, the diameter of the light beam incident on the third lens unit L3 can be reduced and the size of the third lens unit L3 can be reduced.

The stereoscopic optical system 100 according to each example embodiment may satisfy the following inequality (8):

$$1.43 < |f2/f3| < 41.41 \quad (8)$$

where f2 is a focal length of the second lens unit L2, and f3 is the focal length of the third lens unit L3.

Inequality (8) defines a ratio between the focal length of the second lens unit L2 and the focal length of the third lens unit L3. In a case where the value becomes higher than the upper limit of inequality (8), the refractive power of the third lens unit L3 increases, and it becomes difficult for the second lens unit L2 to correct spherical aberration and coma occurring in the third lens unit L3. In a case where the value becomes lower than the lower limit of inequality (8), the refractive power of the second lens unit L2 increases, the diameter of the light beam incident on the third lens unit L3 increases, and it becomes difficult to reduce the size of the third lens unit L3, particularly the second reflective member PR2 disposed closest to the object in the third lens unit L3.

Inequality (8) may be replaced with inequality (8a) or (8b) below:

$$1.52 < |f2/f3| < 39.68 \quad (8a)$$

$$1.60 < |f2/f3| < 37.95 \quad (8b)$$

The stereoscopic optical system 100 according to each example embodiment may satisfy the following inequality (9):

$$4.86 < |f2/f1| < 106.22 \quad (9)$$

where f2 is the focal length of the second lens unit L2, and f1 is the focal length of the first lens unit.

Inequality (9) defines a ratio between the focal length of the second lens unit L2 and the focal length of the first lens unit L1. In a case where the value becomes the upper limit of inequality (9), the refractive power of the first lens unit L1 increases, it becomes difficult for the second lens unit L2 to correct distortion, curvature of field, and lateral chromatic aberration occurring in the first lens unit L1, and high optical performance cannot be realized. In a case where the value becomes lower than the lower limit of inequality (9), the refractive power of the second lens unit L2 increases, and it becomes difficult for the first lens unit L1 to correct distortion, curvature of field, and lateral chromatic aberration occurring in the second lens unit L2. In addition, the refractive power of the first lens unit L1 becomes small, and a wide angle of view of the optical system 101 (102) cannot be realized.

Inequality (9) may be replaced with inequality (9a) or (9b) below:

$$5.16 < |f2/f1| < 101.79 \quad (9a)$$

$$5.47 < |f2/f1| < 97.39 \quad (9b)$$

The stereoscopic optical system 100 according to each example embodiment may satisfy the following inequality (10):

$$50.0 < \omega < 125.0 \quad (10)$$

where ω (°) is a half angle of view of the optical system 101 (102).

Inequality (10) defines a half angle of view (°) of the optical system 101 (102). In a case where the value becomes higher than the upper limit of inequality (10), the angle of view is too wide and an information amount per unit angle of view of the image sensor decreases. In a case where the value becomes lower than the lower limit of inequality (10), a sufficient angle of view cannot be obtained as a wide-angle lens, and the realistic feeling deteriorates during viewing.

Inequality (10) may be replaced with inequality (10a) or (10b) below:

$$55.0 < \omega < 110.0 \quad (10a)$$

$$60.0 < \omega < 100.0 \quad (10b)$$

The stereoscopic optical system 100 according to each example embodiment will be described.

In the stereoscopic optical systems 100 according to Examples 1 to 3, 5, and 6, the second lens unit L2 has positive refractive power. In the stereoscopic optical system 100 according to Example 4, the second lens unit L2 has negative refractive power.

In the stereoscopic optical system 100 according to Example 1, the image height is 4.85 mm, and the base length is assumed to be 60 mm.

In the stereoscopic optical system 100 according to Example 2, the image height is 4.85 mm, and the base length is assumed to be 60 mm.

In the stereoscopic optical system 100 according to Example 3, the image height is 4.85 mm, and the base length is assumed to be 65 mm.

In the stereoscopic optical system 100 according to Example 4, the image height is 3.6 mm, and the base length is assumed to be 60 mm.

In the stereoscopic optical system 100 according to Example 5, the image height is 4.85 mm, and the base length is assumed to be 60 mm.

In the stereoscopic optical system 100 according to Example 6, the image height is 4.85 mm, and the base length is assumed to be 55 mm.

A description will now be given of numerical examples 1 to 6 corresponding to Examples 1 to 6.

In surface data in each numerical example, r represents a radius of curvature of each optical surface, and d (mm) represents an on-axis distance (distance on the optical axis) between an m-th surface and an (m+1)-th surface, where m is a surface number counted from the light incident side. nd represents a refractive index for the d-line of each optical element, and νd represents an Abbe number of the optical element. The Abbe number νd of a certain material is expressed as follows:

$$\nu d = (Nd - 1)/(NF - NC)$$

where Nd, NF, and NC are refractive indices based on the d-line (587.6 nm), the F-line (486.1 nm), and the C-line (656.3 nm) in the Fraunhofer line, respectively.

In each numerical example, values of d, focal length (mm), F-number, and half angle of view (°) are set in a case where the optical system according to each example is in an in-focus state on an infinity object. A "back focus" is a distance on the optical axis from the final lens surface (lens surface closest to the image plane) to the paraxial image plane expressed in air conversion length. An "overall lens length" is a length obtained by adding the back focus to a distance on the optical axis from the frontmost lens surface (lens surface closest to the object) to the final lens surface of the optical system. The "lens unit" includes one or more lenses.

Numerical examples 1 to 4 are based on a method in which the entire optical system is extended during focusing from an object at infinity to a close object. However, in order to reduce the weight of the driving unit, focusing can also be achieved by driving part of the lenses in the optical system.

NUMERICAL EXAMPLE 1
UNIT: mm

SURFACE DATA

| Surface No. | r | d | nd | vd |
|---|---|---|---|---|
| 1 | 27.841 | 1.50 | 1.97852 | 31.8 |
| 2 | 12.152 | 10.68 | | |
| 3 | 750.045 | 0.98 | 1.87900 | 42.0 |
| 4 | 11.020 | 20.94 | | |
| 5 | ∞ | 10.10 | 2.00087 | 25.4 |
| 6 | ∞ | 1.50 | | |
| 7 | −176.024 | 2.70 | 1.61323 | 37.8 |
| 8 | −22.709 | 2.38 | | |
| 9 | 19.994 | 0.50 | 1.88604 | 41.0 |
| 10 | 5.494 | 2.15 | 1.78146 | 25.9 |
| 11 | 14.778 | 2.05 | | |
| 12 (SP) | ∞ | 2.55 | | |
| 13 | ∞ | 10.44 | 2.00174 | 25.5 |
| 14 | ∞ | 1.00 | | |
| 15 | 15.049 | 4.55 | 1.49438 | 88.5 |
| 16 | −8.374 | 0.80 | 1.89998 | 38.7 |
| 17 | −12.286 | 2.48 | | |
| 18 | 14.185 | 0.80 | 1.99681 | 29.5 |
| 19 | 7.624 | 4.03 | 1.49552 | 88.1 |
| 20 | 750.000 | 17.46 | | |
| Image Surface | ∞ | | | |

VARIOUS DATA

| | |
|---|---|
| Focal Length | 3.07 |
| Fno | 3.50 |
| Half Angle of View (°) | 93.00 |
| Image Height | 4.85 |
| Overall Lens Length | 99.60 |
| BF | 17.46 |
| Entrance Pupil Position | 12.14 |
| Exit Pupil Position | −38.45 |
| Front-Side Principal-Point Position | 15.04 |
| Rear-Side Principal-Point Position | 14.39 |

LENS UNIT DATA

| Lens Unit | Starting Surface | Focal Length |
|---|---|---|
| 1 | 1 | −6.34 |
| 2 | 7 | 561.11 |
| 3 | 13 | 16.26 |
| 2A | 7 | 42.23 |
| 2B | 9 | −39.79 |

NUMERICAL EXAMPLE 2
UNIT: mm

SURFACE DATA

| Surface No. | r | d | nd | vd |
|---|---|---|---|---|
| 1 | 36.663 | 1.50 | 1.67790 | 55.3 |
| 2 | 10.546 | 9.15 | | |
| 3 | 750.003 | 0.98 | 1.85150 | 40.8 |
| 4 | 14.455 | 21.97 | | |
| 5 | ∞ | 10.10 | 1.60311 | 60.6 |
| 6 | ∞ | 1.05 | | |
| 7 | −135.559 | 2.68 | 1.63980 | 34.5 |
| 8 | −24.310 | 2.92 | | |
| 9 | 24.550 | 0.50 | 1.85150 | 40.8 |
| 10 | 6.589 | 2.25 | 1.69895 | 30.1 |
| 11 | 25.425 | 2.05 | | |
| 12 (SP) | ∞ | 2.55 | | |
| 13 | ∞ | 10.10 | 1.60311 | 60.6 |
| 14 | ∞ | 1.00 | | |
| 15 | 16.458 | 4.75 | 1.49700 | 81.6 |
| 16 | −9.533 | 0.80 | 1.90043 | 37.4 |
| 17 | −13.785 | 1.20 | | |
| 18 | 17.501 | 0.80 | 1.95375 | 32.3 |
| 19 | 8.340 | 3.37 | 1.4970 | 0 81.6 |
| 20 | 750.003 | 19.88 | | |
| Image Surface | ∞ | | | |

-continued

| VARIOUS DATA | |
|---|---|
| Focal Length | 3.97 |
| Fno | 3.50 |
| Half Angle of View (°) | 72.00 |
| Image Height | 4.85 |
| Overall Lens Length | 99.60 |
| BF | 19.88 |
| Entrance Pupil Position | 12.19 |
| Exit Pupil Position | −34.78 |
| Front-Side Principal-Point Position | 15.87 |
| Rear-Side Principal-Point Position | 15.91 |

LENS UNIT DATA

| Lens Unit | Starting Surface | Focal Length |
|---|---|---|
| 1 | 1 | −7.90 |
| 2 | 7 | 115.15 |
| 3 | 13 | 18.97 |
| 2A | 7 | 45.87 |
| 2B | 9 | −66.41 |

NUMERICAL EXAMPLE 3
UNIT: mm

SURFACE DATA

| Surface No. | r | d | nd | vd |
|---|---|---|---|---|
| 1 | 30.885 | 1.90 | 2.00100 | 29.1 |
| 2 | 11.891 | 11.21 | | |
| 3 | −97.370 | 1.05 | 1.90043 | 37.4 |
| 4 | 16.258 | 15.00 | | |
| 5 | −22.903 | 0.85 | 1.85150 | 40.8 |
| 6 | 24.855 | 1.50 | | |
| 7 | 47.604 | 3.57 | 1.76182 | 26.5 |
| 8 | −17.939 | 13.34 | | |
| 9 | ∞ | 11.37 | 2.00069 | 25.5 |
| 10 | ∞ | 1.58 | | |
| 11 | 70.039 | 1.00 | 1.77250 | 49.6 |
| 12 | 12.185 | 4.46 | 1.51823 | 58.9 |
| 13 | −13.095 | 3.05 | | |
| 14 | −11.269 | 1.00 | 1.90043 | 37.4 |
| 15 | −13.285 | 2.00 | | |
| 16 (SP) | ∞ | 2.15 | | |
| 17 | ∞ | 11.37 | 2.00069 | 25.5 |
| 18 | ∞ | 2.69 | | |
| 19 | 25.771 | 3.25 | 1.51633 | 64.1 |
| 20 | 108.049 | 3.48 | | |
| 21 | 12.930 | 2.74 | 1.51742 | 52.4 |
| 22 | −37.831 | 0.66 | | |
| 23 | 48.898 | 0.75 | 2.00100 | 29.1 |
| 24 | 7.227 | 4.57 | 1.48749 | 70.2 |
| 25 | −27.691 | 13.50 | | |
| Image Surface | ∞ | | | |

| VARIOUS DATA | |
|---|---|
| Focal Length | 2.97 |
| Fno | 2.91 |
| Half Angle of View (°) | 90.05 |
| Image Height | 4.85 |
| Overall Lens Length | 118.02 |
| BF | 13.50 |
| Entrance Pupil Position | 12.18 |
| Exit Pupil Position | −36.47 |
| Front-Side Principal-Point Position | 14.97 |
| Rear-Side Principal-Point Position | 10.53 |

LENS UNIT DATA

| Lens Unit | Starting Surface | Focal Length |
|---|---|---|
| 1 | 1 | −7.83 |
| 2 | 11 | 47.53 |
| 3 | 17 | 26.66 |

-continued

| | | |
|---|---|---|
| 2A | 11 | 32.52 |
| 2B | 14 | −107.80 |

NUMERICAL EXAMPLE 4
UNIT: mm

SURFACE DATA

| Surface No. | r | d | nd | νd |
|---|---|---|---|---|
| 1 | 37.852 | 1.50 | 1.67790 | 55.3 |
| 2 | 10.150 | 7.75 | | |
| 3 | 94.571 | 0.98 | 1.95375 | 32.3 |
| 4 | 13.924 | 23.23 | | |
| 5 | ∞ | 9.58 | 2.00069 | 25.5 |
| 6 | ∞ | 5.31 | | |
| 7 | −749.999 | 1.40 | 1.56732 | 42.8 |
| 8 | −29.597 | 2.00 | | |
| 9 | 19.516 | 0.50 | 1.85150 | 40.8 |
| 10 | 4.830 | 1.62 | 1.75520 | 27.5 |
| 11 | 11.726 | 0.87 | | |
| 12 | −12.070 | 1.38 | 1.62004 | 36.3 |
| 13 | −9.839 | 2.00 | | |
| 14 (SP) | ∞ | 2.45 | | |
| 15 | ∞ | 6.04 | 2.00069 | 25.5 |
| 16 | ∞ | 3.81 | | |
| 17 | 13.248 | 4.86 | 1.49700 | 81.5 |
| 18 | −8.191 | 0.80 | 1.90043 | 37.4 |
| 19 | −12.068 | 3.16 | | |
| 20 | 17.035 | 0.80 | 1.91082 | 35.2 |
| 21 | 6.351 | 3.70 | 1.55032 | 75.5 |
| 22 | 750.014 | 15.86 | | |
| Image Surface | ∞ | | | |

VARIOUS DATA

| | |
|---|---|
| Focal Length | 2.95 |
| Fno | 4.00 |
| Half Angle of View (°) | 72.00 |
| Image Height | 3.60 |
| Overall Lens Lenght | 99.60 |
| BF | 15.86 |
| Entrance Pupil Position | 11.52 |
| Exit Pupil Position | −36.97 |
| Front-Side Principal-Point Position | 14.30 |
| Rear-Side Principal-Point Position | 12.91 |

LENS UNIT DATA

| Lens Unit | Starting Surface | Focal Length |
|---|---|---|
| 1 | 1 | −7.81 |
| 2 | 7 | −365.78 |
| 3 | 15 | 16.77 |
| 2A | 7 | 54.27 |
| 2B | 9 | −45.81 |

NUMERICAL EXAMPLE 5
UNIT: mm

SURFACE DATA

| Surface No. | r | d | nd | νd |
|---|---|---|---|---|
| 1 | 28.676 | 1.50 | 2.00100 | 29.1 |
| 2 | 7.352 | 5.23 | | |
| 3 | 750.013 | 0.98 | 2.00069 | 25.5 |
| 4 | 15.922 | 1.70 | | |
| 5 | ∞ | 9.90 | 1.60311 | 60.6 |
| 6 | ∞ | 2.61 | | |
| 7 | −37.532 | 1.54 | 1.51823 | 58.9 |
| 8 | −11.282 | 2.00 | | |
| 9 | −16.120 | 0.50 | 1.91082 | 35.2 |
| 10 | 6.480 | 2.28 | 1.80809 | 22.8 |
| 11 | −20.068 | 2.05 | | |
| 12 (SP) | ∞ | 4.01 | | |
| 13 | ∞ | 8.32 | 1.60311 | 60.6 |
| 14 | ∞ | 1.00 | | |
| 15 | 12.083 | 4.04 | 1.51633 | 64.1 |

-continued

| | | | | |
|---|---|---|---|---|
| 16 | −20.607 | 1.16 | | |
| 17 | 36.247 | 4.18 | 1.49700 | 81.6 |
| 18 | −8.255 | 0.80 | 2.00100 | 29.1 |
| 19 | −22.198 | 0.50 | | |
| 20 | 16.406 | 0.80 | 1.95375 | 32.3 |
| 21 | 7.200 | 4.10 | 1.49700 | 81.6 |
| 22 | 750.105 | 15.62 | | |
| Image Surface | ∞ | | | |

VARIOUS DATA

| | |
|---|---|
| Focal Length | 3.97 |
| Fno | 3.50 |
| Half Angle of View (°) | 72.00 |
| Image Height | 4.85 |
| Overall Lens Length | 74.81 |
| BF | 15.62 |
| Entrance Pupil Positon | 6.93 |
| Exit Pupil Position | −38.43 |
| Front-Side Principal-Point Position | 10.61 |
| Rear-Side Principal-Point Position | 11.65 |

LENS UNIT DATA

| Lens Unit | Starting Surface | Focal Length |
|---|---|---|
| 1 | 1 | −5.21 |
| 2 | 7 | 232.88 |
| 3 | 13 | 15.34 |
| 2A | 7 | 30.52 |
| 2B | 9 | −35.67 |

NUMERICAL EXAMPLE 6
UNIT: mm

SURFACE DATA

| Surface No. | r | d | nd | νd |
|---|---|---|---|---|
| 1 | 41.519 | 1.50 | 1.55032 | 75.5 |
| 2 | 8.751 | 7.75 | | |
| 3 | 197.472 | 1.20 | 2.00100 | 29.1 |
| 4 | 13.163 | 14.07 | | |
| 5 | ∞ | 9.06 | 1.60311 | 60.6 |
| 6 | ∞ | 1.09 | | |
| 7 | −56.756 | 1.46 | 1.53172 | 48.8 |
| 8 | −16.788 | 2.00 | | |
| 9 | −349.205 | 0.50 | 1.85150 | 40.8 |
| 10 | 7.979 | 2.37 | 1.72151 | 29.2 |
| 11 | −54.383 | 2.05 | | |
| 12 (SP) | ∞ | 2.55 | | |
| 13 | ∞ | 10.10 | 1.60311 | 60.6 |
| 14 | ∞ | 1.11 | | |
| 15 | 13.766 | 5.32 | 1.49700 | 81.6 |
| 16 | −9.495 | 0.80 | 1.80400 | 46.5 |
| 17 | −15.473 | 0.89 | | |
| 18 | 16.235 | 0.80 | 2.00100 | 29.1 |
| 19 | 7.488 | 4.05 | 1.49700 | 81.6 |
| 20 | 750.003 | 18.34 | | |
| Image Surface | ∞ | | | |

VARIOUS DATA

| | |
|---|---|
| Focal Length | 4.40 |
| Fno | 3.50 |
| Half Angle of View (°) | 65.00 |
| Image Height | 4.85 |
| Overall Lens Length | 87.00 |
| BF | 18.34 |
| Entrance Pupil Position | 10.69 |
| Exit Pupil Position | −31.36 |
| Front-Side Principal-Point Position | 14.70 |
| Rear-Side Principal-Point Position | 13.94 |

-continued

| LENS UNIT DATA | | |
|---|---|---|
| Lens Unit | Starting Surface | Focal Length |
| 1 | 1 | −6.77 |
| 2 | 7 | 57.96 |
| 3 | 13 | 19.70 |
| 2A | 7 | 44.27 |
| 2B | 9 | −195.25 |

Tables 1 and 2 below summarize various values in each numerical example. In all examples, the d-line was used as the reference wavelength, and the values illustrated in Tables 1 and 2 below are based on this reference wavelength.

TABLE 1

| | Ex 1 | Ex 2 | Ex 3 | Ex 4 | Ex 5 | Ex 6 |
|---|---|---|---|---|---|---|
| f | 3.07 | 3.97 | 2.97 | 2.95 | 3.97 | 4.40 |
| f1 | −6.34 | −7.90 | −7.83 | −7.81 | −5.21 | −6.77 |
| f2 | 561.11 | 115.15 | 47.53 | −365.78 | 232.88 | 57.96 |
| f3 | 16.26 | 18.97 | 26.66 | 16.77 | 15.34 | 19.70 |
| f2A | 42.23 | 45.87 | 32.52 | 54.27 | 30.52 | 44.27 |
| f2B | −39.79 | −66.41 | −107.80 | −45.81 | −35.67 | −195.25 |
| dTotal | 99.60 | 99.60 | 118.02 | 99.60 | 74.81 | 87.00 |
| dG1P | 55.48 | 55.15 | 72.88 | 58.13 | 30.29 | 43.05 |
| dPI | 44.12 | 44.45 | 45.14 | 41.47 | 44.52 | 43.95 |
| Din | 60.00 | 60.00 | 65.00 | 60.00 | 60.00 | 55.00 |
| Dout | 11.80 | 11.80 | 11.80 | 9.30 | 11.80 | 11.80 |
| ω | 93.00 | 72.00 | 90.05 | 72.00 | 72.00 | 65.00 |

TABLE 2

| | Ex 1 | Ex 2 | Ex 3 | Ex 4 | Ex 5 | Ex 6 |
|---|---|---|---|---|---|---|
| (1) | 0.44 | 0.45 | 0.38 | 0.42 | 0.60 | 0.51 |
| (2) | −2.45 | −3.50 | −4.04 | −2.73 | −2.33 | −9.91 |
| (3) | 0.20 | 0.20 | 0.18 | 0.12 | 0.20 | 0.21 |
| (4) | −2.06 | −1.99 | −2.64 | −2.65 | −1.31 | −1.54 |
| (5) | −1.06 | −0.69 | −0.30 | −1.18 | −0.86 | −0.23 |
| (6) | −6.66 | −5.80 | −4.16 | −6.95 | −5.86 | −6.54 |
| (7) | 18.05 | 13.90 | 24.57 | 19.73 | 7.63 | 9.79 |
| (8) | 34.50 | 6.07 | 1.78 | 21.81 | 15.18 | 2.94 |
| (9) | 88.51 | 14.57 | 6.07 | 46.85 | 44.70 | 8.56 |
| (10) | 93.00 | 72.00 | 90.05 | 72.00 | 72.00 | 65.00 |

Image Pickup Apparatus

Figure 9:
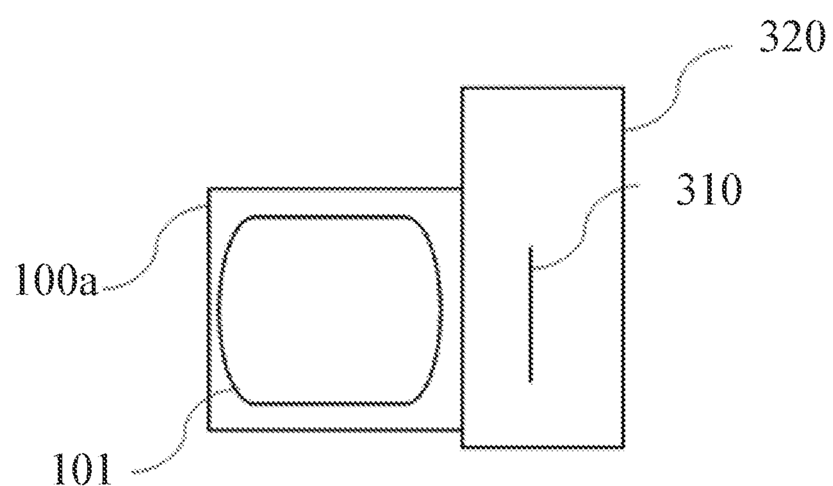
FIG. 9 schematically illustrates an image pickup apparatus.

A description will be given of an example of the image pickup apparatus 300 according to this disclosure. FIG. 9 is a schematic diagram of an image pickup apparatus (digital still camera) 300 according to this example. The image pickup apparatus 300 includes a camera body 320 having an image sensor 310, and a lens apparatus 100*a* including two optical systems 101 and 102 similar to any one of Examples 1 to 6 described above. The lens apparatus 100*a* and the camera body 320 may be integrally configured or attachable to and detachable from each other. The camera body 320 may be a so-called single-lens reflex camera with a quick turn mirror, or a so-called mirrorless camera having no quick turn mirror. The image sensor 310 is a solid-state image sensor (photoelectric conversion element), such as a CCD sensor or a CMOS sensor, that receives and photoelectrically converts the optical image formed by the two optical systems 101 and 102. FIG. 9 illustrates only the optical system 101 because the two optical systems 101 and 102 are arranged in parallel in the depth direction.

The image pickup apparatus 300 according to this example includes the lens apparatus 100*a*, and thus can capture stereoscopic images using two optical systems 101 and 102 and a single smaller image sensor.

The stereoscopic optical system 100 according to any one of the above examples can be applied not only to the digital still camera illustrated in FIG. 9 but also to various image pickup apparatuses, such as a broadcasting camera, a film-based camera, and a surveillance camera.

While the disclosure has described example embodiments, it is to be understood that some embodiments are not limited to the disclosed embodiments. The scope of the following claims is to be accorded the broadest interpretation so as to encompass all such modifications and equivalent structures and functions.

Each example can provide a stereoscopic optical system that is compatible with a smaller image sensor while maintaining high optical performance, and an image pickup apparatus having this stereoscopic optical system.

This application claims priority to Japanese Patent Application No. 2023-003965, which was filed on Jan. 13, 2023 and which is hereby incorporated by reference herein in its entirety.

What is claimed is:

1. A stereoscopic optical system comprising two optical systems arranged in parallel, wherein each of the two optical systems includes a plurality of lens units that consist of, in order from an object side to an image side, a first lens unit having negative refractive power, a second lens unit, and a third lens unit having positive refractive power, wherein the first lens unit includes a first reflective member disposed closest to an image plane in the first lens unit, wherein the third lens unit includes a second reflective member disposed closest to an object in the third lens unit, wherein the second lens unit includes a plurality of subunits that consist of, in order from the object side to the image side, a first subunit having positive refractive power and a second subunit having negative refractive power that are spaced by a widest air gap in the second lens unit, and wherein the second subunit includes an aperture stop disposed closest to the image plane in the second subunit.

2. The stereoscopic optical system according to claim 1, wherein the following inequality is satisfied:

$$0.33 < dPI/d\text{Total} < 0.67,$$

where dPI is a distance on an optical axis from the aperture stop to the image plane, and dTotal is a distance on the optical axis from a lens surface on the object side of a lens disposed closest to the object in each of the two optical systems to the image plane.

3. The stereoscopic optical system according to claim 1, wherein the following inequality is satisfied:

$$-12.89 < f2B/f3 < -1.25,$$

where f2B is a focal length of the second subunit, and f3 is a focal length of the third lens unit.

4. The stereoscopic optical system according to claim 1, wherein the following inequality is satisfied:

$$0.03 < D\text{out}/D\text{in} < 0.50,$$

where Din is a distance between surface vertices of lenses disposed closest to the object in the first lens units of the two optical systems, and Dout is a distance between surface vertices of lenses disposed closest to the image plane in the third lens units of the two optical systems.

5. The stereoscopic optical system according to claim 1, wherein the following inequality is satisfied:

$$-3.18 < f1/f < -1.05,$$

where f1 is a focal length of the first lens unit, and f is a focal length of each of the two optical systems.

6. The stereoscopic optical system according to claim 1, wherein the following inequality is satisfied:

$$-1.42 < f2A/f2B < -0.16,$$

where f2A is a focal length of the first subunit, and f2B is a focal length of the second subunit.

7. The stereoscopic optical system according to claim 1, wherein the following inequality is satisfied:

$$-8.34 < f2A/f1 < -3.32,$$

where f2A is a focal length of the first subunit, and f1 is a focal length of the first lens unit.

8. The stereoscopic optical system according to claim 1, wherein the following inequality is satisfied:

$$5.72 < dG1P/f < 30.72,$$

where dG1P is a distance on an optical axis from a lens surface on the object side of a lens disposed closest to the object to the aperture stop, and f is a focal length of each of the two optical systems.

9. The stereoscopic optical system according to claim 1, wherein the second lens unit has positive refractive power.

10. The stereoscopic optical system according to claim 1, wherein the following inequality is satisfied:

$$1.43 < |f2/f3| < 41.41,$$

where f2 is a focal length of the second lens unit, and f3 is a focal length of the third lens unit.

11. The stereoscopic optical system according to claim 1, wherein the following inequality is satisfied:

$$4.86 < |f2/f1| < 106.22,$$

where f2 is a focal length of the second lens unit, and f1 is a focal length of the first lens unit.

12. The stereoscopic optical system according to claim 1, wherein the following inequality is satisfied:

$$50.0 < \omega < 125.0,$$

where ω (°) is a half angle of view of each of the two optical systems.

13. An image pickup apparatus comprising:

a stereoscopic optical system; and an image sensor configured to capture an optical image formed by the two optical systems, wherein the stereoscopic optical system includes two optical systems arranged in parallel, wherein each of the two optical systems includes a plurality of lens units that consist of, in order from an object side to an image side, a first lens unit having negative refractive power, a second lens unit, and a third lens unit having positive refractive power, wherein the first lens unit includes a first reflective member disposed closest to an image plane in the first lens unit, wherein the third lens unit includes a second reflective member disposed closest to an object in the third lens unit, wherein the second lens unit includes a plurality of subunits that consist of, in order from the object side to the image side, a first subunit having positive refractive power and a second subunit having negative refractive power that are spaced by a widest air gap in the second lens unit, and wherein the second subunit includes an aperture stop disposed closest to the image plane in the second subunit.

14. The image pickup apparatus according to claim 13, wherein the two optical systems form optical images on the image sensor.

15. A stereoscopic optical system comprising two optical systems arranged in parallel, wherein each of the two optical systems includes a plurality of lens units that consist of, in order from an object side to an image side, a first lens unit having negative refractive power, a second lens unit, and a third lens unit having positive refractive power, wherein the first lens unit includes a first reflective member disposed closest to an image plane in the first lens unit, wherein the third lens unit includes a second reflective member disposed closest to an object in the third lens unit, wherein the second unit includes a positive lens, and an aperture stop disposed closest to the image plane in the second unit, and wherein the following inequality is satisfied:

$$0.03 < D\ \mathrm{out}/D\ \mathrm{in} < 0.27,$$

where Din is a distance between surface vertices of lenses disposed closest to an object in the first lens units of the two optical systems, and Dout is a distance between surface vertices of lenses disposed closest to an image plane in the third lens units of the two optical systems.

* * * * *